United States Patent
Liang et al.

(10) Patent No.: US 9,307,388 B2
(45) Date of Patent: Apr. 5, 2016

(54) METHOD AND APPARATUS FOR SUPPORTING USER EQUIPMENT MOBILITY IN A WIRELESS COMMUNICATION SYSTEM

(75) Inventors: Huarui Liang, Beijing (CN); Hong Wang, Beijing (CN)

(73) Assignee: Samsung Electronics Co., Ltd (KR)

(*) Notice: Subject to any disclaimer, the term of this patent is extended or adjusted under 35 U.S.C. 154(b) by 50 days.

(21) Appl. No.: 13/345,292

(22) Filed: Jan. 6, 2012

(65) Prior Publication Data

US 2012/0177005 A1     Jul. 12, 2012

(30) Foreign Application Priority Data

Jan. 6, 2011  (CN) .......................... 2011 1 0020180

(51) Int. Cl.
| | | |
|---|---|---|
| H04W 8/02 | (2009.01) | |
| H04W 8/08 | (2009.01) | |
| H04W 8/26 | (2009.01) | |
| H04W 36/08 | (2009.01) | |
| H04W 48/16 | (2009.01) | |
| H04W 76/02 | (2009.01) | |
| H04W 88/08 | (2009.01) | |

(52) U.S. Cl.
CPC .............. *H04W 8/02* (2013.01); *H04W 8/082* (2013.01); *H04W 8/26* (2013.01); *H04W 36/08* (2013.01); *H04W 48/16* (2013.01); *H04W 76/02* (2013.01); *H04W 88/08* (2013.01)

(58) Field of Classification Search
CPC ..... H04W 28/04; H04W 36/08; H04W 48/16; H04W 76/02; H04W 88/08; H04W 8/02; H04W 8/082; H04W 8/26
See application file for complete search history.

(56) References Cited

U.S. PATENT DOCUMENTS

| | | | |
|---|---|---|---|
| 2009/0092080 A1 | 4/2009 | Balasubramanian et al. | |
| 2009/0262683 A1* | 10/2009 | Khetawat et al. | 370/328 |
| 2010/0069101 A1 | 3/2010 | Mahdi et al. | |
| 2010/0195621 A1 | 8/2010 | Kekki et al. | |
| 2010/0272013 A1 | 10/2010 | Horn et al. | |
| 2011/0103310 A1* | 5/2011 | Stojanovski et al. | 370/328 |
| 2011/0170517 A1* | 7/2011 | Bakker et al. | 370/331 |
| 2011/0171953 A1* | 7/2011 | Faccin et al. | 455/426.1 |
| 2012/0039304 A1* | 2/2012 | Kim et al. | 370/332 |
| 2012/0082090 A1* | 4/2012 | Horn et al. | 370/328 |
| 2012/0182940 A1* | 7/2012 | Taleb et al. | 370/328 |
| 2012/0224536 A1* | 9/2012 | Hahn et al. | 370/328 |
| 2012/0300750 A1* | 11/2012 | Chin et al. | 370/331 |
| 2013/0107702 A1* | 5/2013 | Gupta et al. | 370/230 |

* cited by examiner

*Primary Examiner* — Andrew Lai
*Assistant Examiner* — M Mostazir Rahman
(74) *Attorney, Agent, or Firm* — The Farrell Law Firm, P.C.

(57) ABSTRACT

Methods are provided for supporting mobility of a UE in a system without an HeNB GW. An S1 setup request message is sent to an MME by an HeNB. The S1 setup request message includes version information of the HeNB. An RRC connection is established between the UE and the HeNB. An initial UE message is sent from the HeNB to the MME. An NAS message is sent from the UE to the MME. An establish bearer request message is sent from the MME to a corresponding SGW based on an IP address of an LGW. The IP address of the LGW is obtained by the MME through the S1 setup request message. An establish bearer response message is sent from the LGW to the SGW in response to the establish bearer request message. The establish bearer response message is sent from the SGW to the MME.

8 Claims, 13 Drawing Sheets

US 9,307,388 B2

METHOD AND APPARATUS FOR SUPPORTING USER EQUIPMENT MOBILITY IN A WIRELESS COMMUNICATION SYSTEM

PRIORITY

This application claims priority under 35 U.S.C. §119(a) to an application filed in the Chinese Patent and Trademark Office on Jan. 6, 2011, and assigned Serial No. 201110020180.6, the contents of which are incorporated herein by reference.

BACKGROUND OF THE INVENTION

1. Field of the Invention

The present invention relates generally to wireless communication technology, and more particularly, to a method and an apparatus for supporting User Equipment (UE) mobility in a wireless communication system.

2. Description of the Related Art

The structure of System Architecture Evolution (SAE) is illustrated in FIG. 1. A UE 101 is a terminal device for receiving data. An Evolved Universal Terrestrial Radio Access Network (EUTRAN) 102 is a wireless access network that includes evolved Node B (eNB), which provides the UE 101 with an interface for a wireless network. A Mobile Management Entity (MME) 103 manages a mobility context, a session context, and information about security for the UE 101. A Serving GateWay (SGW) 104 primarily offers the functions of a user plane. MME 103 and SGW 104 can be located at the same physical entity. A Local GateWay (LGW) 105 is responsible for functions such as, charging, legal interception, etc. It is possible for both the SGW 104 and the LGW 105 to be located at the same physical entity. A Policy and Charging Rules Function (PCRF) 108 provides a Quality of Service (QoS) policy and charging criterion. A Serving General Packet Radio Service (GPRS) Supporting Node (SGSN) 108 is network node equipment that provides routing for data transmission in a Universal Mobile Telecommunications System (UMTS). A Home Subscriber Server (HSS) 109 is a home subscriber sub-system, which is responsible for storing user information, such as, for example, a current location of the UE, an address of the serving node, security related information for the user, activated packet data context for the UE, etc.

Due to the increased speed of UE data services, $3^{rd}$ Generation Partnership Project (3GPP) networks have been proposed that have the ability to support Selected Internet Protocol Traffic Offload (SIPTO) and Local Internet Protocol Access (LIPA). In SIPTO, when the UE accesses the Internet or an external network through a Home eNB (HeNB), a Home Node B (HNB) or an eNB/NodeB, the network can select or re-select a user plane node that is closer to a wireless access network for the UE. When the UE accesses the home network or network in an enterprise through HeNB or HNB, and LIPA is executed, a user plane node closer to the HeNB/HNB can be selected or reselected for the UE, or a user plane node located in HeNB/HNB access network can be selected for the UE. The user plane mode can be core network equipment or a gateway. The SAE system can be a SGW, a PGW or an LGW. The UMTS system can be an SGSN or a Gateway GPRS Support Node (GGSN).

FIG. 2 is a structural schematic diagram of a Long Term Evolution (LTE) network deployment. As shown in FIG. 2, an MME 103 may be simultaneously connected to an R-10 HeNB 201 supporting LIPA, an R-11 HeNB 202 supporting LIPA, an HeNB 205 of different releases through HeNB GW 203, and an R-11 HeNB 204 supporting SIPTO or an R-10 HeNB (not depicted) supporting SIPTO. The R-10 and R-11 means numbers of releases regarding LTE standards defined by 3GPP.

FIG. 3 is a structural schematic diagram of an existing UMTS network deployment. As shown in FIG. 3, an SGSN 301 may be simultaneously connected to an R-10 HeNB 304 supporting LIPA, an R-11 HeNB 305 supporting LIPA and an R-11 HeNB 306 supporting SIPTO through an HNB GW 303.

LIPA in 3GPP R-10 does not support mobility. When the UE moves out of an HeNB supporting LIPA, the services of the UE related to LIPA are interrupted. It is required to support mobility in 3GPP R-11, and when the UE moves out of an existing HeNB or SIPTO HeNB, as long as the UE is still within a network in enterprise or a home network, a LIPA/SIPTO service of the UE should not be interrupted.

However, the network side is not able to determine whether the current service of the UE is LIPA or SIPTO. When the UE's subscription information supports both SIPTO and LIPA, the network side cannot determine whether the current service is LIPA or SIPTO based on the UE context information and subscription information because they both use general APN information. Therefore, when an R-10 HeNB, an R-11 HeNB, an R-10 SIPTO HeNB and an R-11 SIPTO HeNB are simultaneously connected, and when the UE moves out of the current base station, the network side cannot determine a subsequent action, such as, for example, keeping a LIPA/SIPTO service of the UE, or interrupting a LIPA/SIPTO service of the UE. Therefore, when the UE moves from an R-10 HeNB supporting LIPA to other cells, the network side may execute the wrong operation because the network side cannot correctly determine which kind of HeNB the UE is in, which will adversely affect the network.

SUMMARY OF THE INVENTION

The present invention has been made to address at least the above problems and/or disadvantages and to provide at least the advantages described below.

Accordingly, an aspect of the present invention provides a method and an apparatus for supporting mobility of a UE efficiently in a wireless communication system.

Another aspect of the present invention provides a method and an apparatus for supporting mobility of a UE using the LIPA or SIPTO service in a wireless communication system.

Another aspect of the present invention provides a method for supporting mobility of a UE, which can correctly determine the mobility of the UE executing the LIPA or SIPTO service, avoid network executing error, and reduce the waste of signalling resources and radio resources.

According to an aspect of the present invention, a method is provided for supporting mobility of a UE in wireless communication. Version information of an HeNB is obtained for the UE. A service type associated with the mobility of the UE is determined based on the version information of the HeNB.

According to another aspect of the present invention, a method is provided for supporting mobility of a UE in wireless communication. Subscription information of the UE and a service type associated with the mobility of the UE are obtained from a network. UE context information indicating a service to which the UE has access is established according to the subscription information and the service type.

According to another aspect of the present invention, an apparatus is provided for supporting mobility of a UE in wireless communication. The apparatus includes a communication interface for communicating with a network entity.

The apparatus also includes a controller for obtaining version information of an HeNB for the UE through the communication interface, and determining a service type associated with the mobility of the UE, based on the version information of the HeNB.

According to another aspect of the present invention, an apparatus is provided for supporting mobility of a UE in wireless communication. The apparatus includes a communication interface for communicating with a network entity. The apparatus also includes a controller for obtaining subscription information of the UE and a service type associated with the mobility of the UE from a network, and establishing UE context information indicating a service to which the UE accesses, according to the subscription information and the service type.

According to another aspect of the present invention, a method is provided for supporting mobility of a UE in wireless communication. UE context information is established indicating a service type associated with the mobility of the UE to which a service is provided through an HeNB. It is determined whether to allow a handover request from the HeNB, according to the service type.

According to another aspect of the present invention, a method is provided for supporting mobility of a UE in wireless communication. UE context information is established indicating a service type associated with the mobility of the UE to which a service is provided through an HeNB. Either a LIPA deactivation or a location update process is performed according to the service type when the UE is in an idle state and moves.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
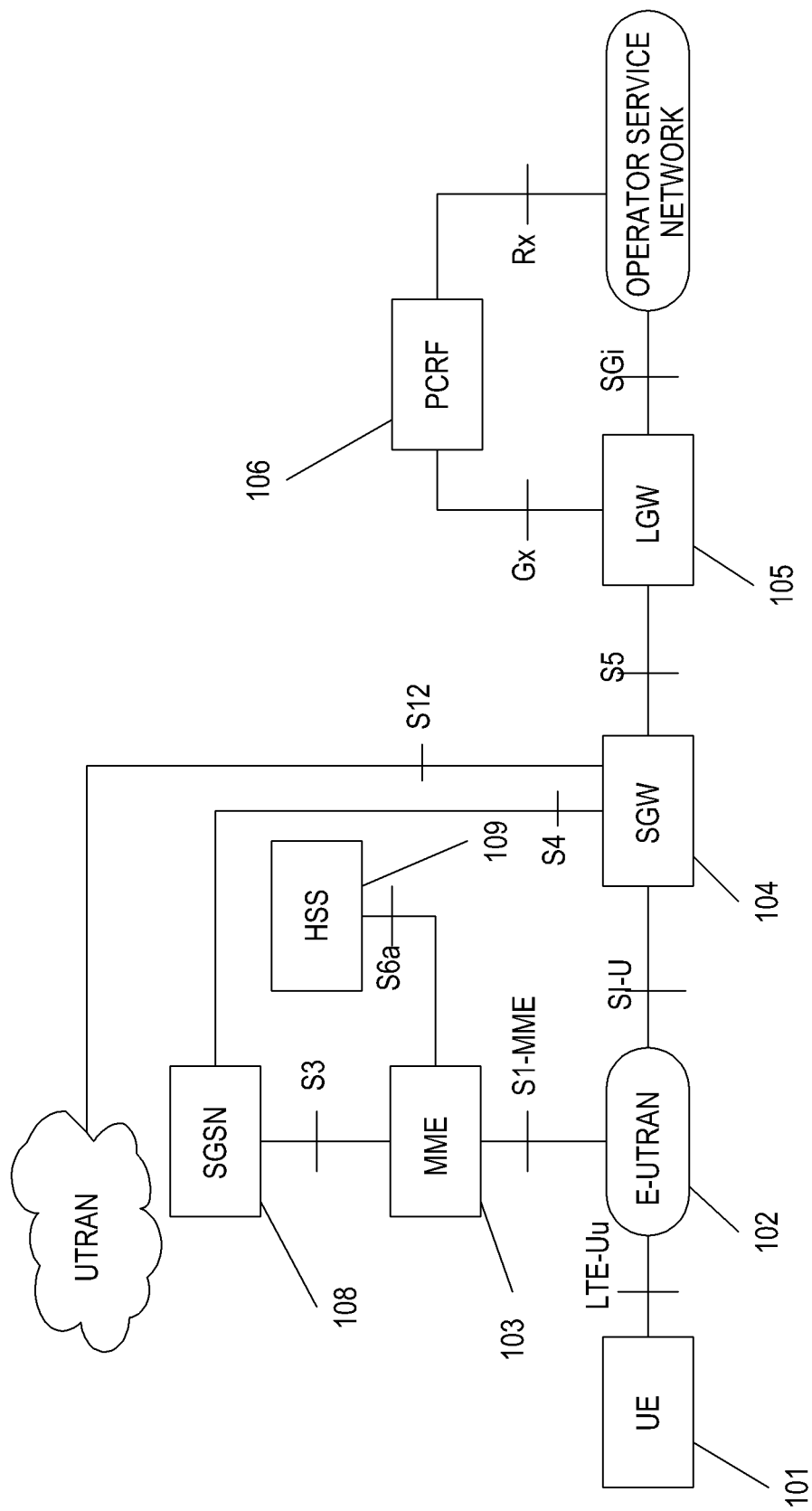
FIG. 1 is a diagram illustrating a structure of an existing SAE system.
Figure 2:
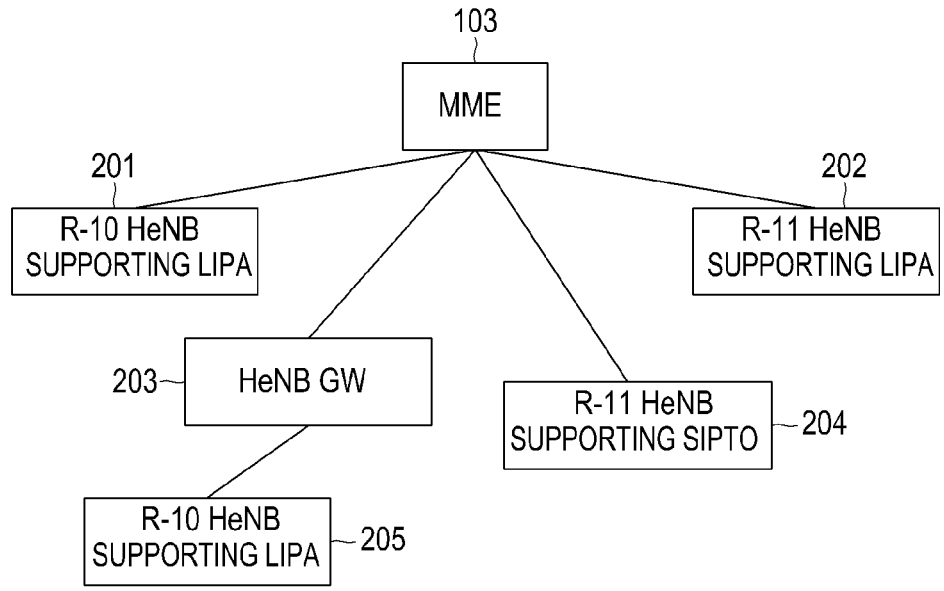
FIG. 2 is a structural schematic diagram of an existing LTE network deployment.
Figure 3:
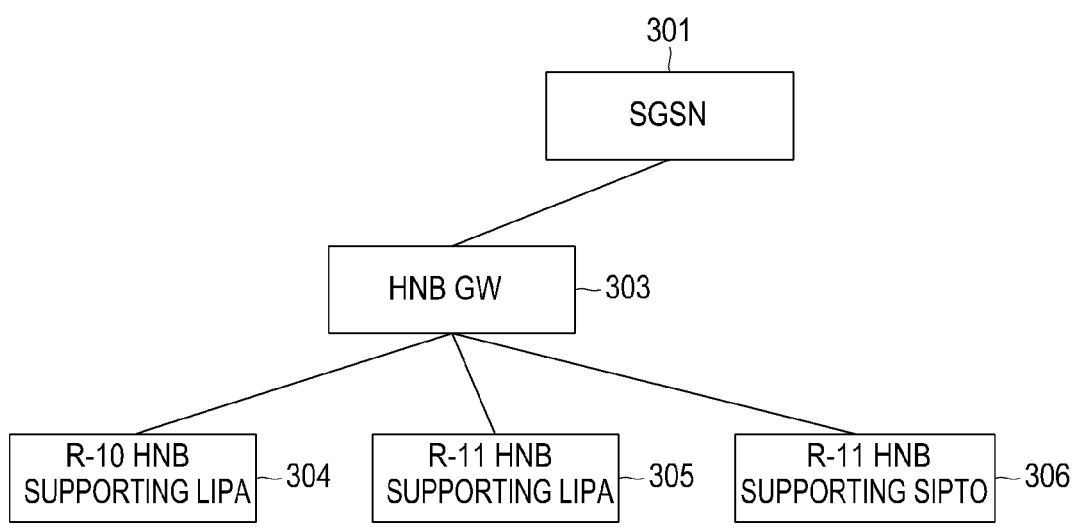
FIG. 3 is a structural schematic diagram of an existing UMTS network deployment.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a method for supporting UE mobility, in which a service type of a UE is obtained by an MME. When the UE initiates handover, the MME can determine whether service continuity can be ensured after the UE handover to a target base station, according to the obtained service type. If service continuity can be ensured, the handover is successful, otherwise, the handover is failed.

According to one aspect of the present invention, a method is provided for supporting mobility of a UE in a system without an HeNB GW. An S1 setup request message is sent to an MME by an HeNB. The S1 setup request message includes version information of the HeNB. A Radio Resource Control (RRC) connection is established between the UE and the HeNB. An initial UE message is sent from the HeNB to the MME. A Non Access Stratum (NAS) message is sent from the UE to the MME. An establish bearer request message is sent from the MME to a corresponding SGW based on an Internet Protocol (IP) address of an LGW. The IP address of the LGW is obtained by the MME through the S1 setup request message. An establish bearer response message is sent from the LGW to the SGW in response to the establish bearer request message. The establish bearer response message is sent from the SGW to the MME.

According to another aspect of the present invention, a method is provided for supporting mobility of a UE in a system with an HeNB GW. An RRC connection is established between the UE and the HeNB. An initial UE message is sent from the HeNB to the HeNB GW. The initial UE message is sent from the HeNB GW to an MME. The initial UE message includes version information of the HeNB. An NAS message is sent from the UE to the MME. An establish bearer request message is sent from the MME to a corresponding SGW based on an IP address of an LGW. The IP address of the LGW is obtained by the MME through an S1 setup request message. An establish bearer response message is sent from the LGW to the SGW in response to the establish bearer request message, and the establish bearer response message is sent from the SGW to the MME.

According to an additional aspect of the present invention, a method is provided for supporting mobility of a UE in a system with an HeNB GW. An S1 setup request message is sent from an HeNB to the HeNB GW. The S1 setup request message includes version information of the HeNB. An RRC connection is established between the UE and the HeNB. An initial UE message is sent from the HeNB to the HeNB GW. The initial UE message is sent from the HeNB GW to an MME. An NAS message is sent from the UE to the MME. The MME requests version information of the HeNB from the HeNB GW. The version information of the HeNB is sent from the HeNB GW to the MME. An establish bearer request message is sent from the MME to a corresponding SGW based on an IP address of an LGW. The IP address of the LGW is obtained, by the MME, through the S1 setup request message. The establish bearer request message is sent from the SGW to the LGW. An establish bearer response message is sent from the LGW to the SGW in response to the establish bearer request message. The establish bearer response message is sent from the SGW to the MME.

According to a further aspect of the present invention, a method is provided for supporting mobility of a UE in a system with an HeNB GW. An S1 setup request message is sent from an HeNB to the HeNB GW. The S1 setup request message includes version information of the HeNB. An RRC connection is established between the UE and the HeNB. An initial UE message is sent from the HeNB to the HeNB GW. The initial UE message is sent from the HeNB GW to an MME. The initial UE message comprises version information of the HeNB. An NAS message is sent from the UE to the MME. An establish bearer request message is sent from the MME to a corresponding SGW based on an IP address of an LGW. The IP address of the LGW is obtained by the MME through the S1 setup request message. The establish bearer request message is sent from the SGW to the LGW. An establish bearer response message is sent from the LGW to the SGW in response to the establish bearer request message. The establish bearer response message is sent from the SGW to the MME. A UE context is established by the MME according to the version information of the HeNB and the subscription information. The UE context indicates that a service that the UE accesses at least one of an R-10 LIPA, an R-11 LIPA, or a SIPTO.

Additionally, according to another aspect of the present invention, a method is provided for supporting mobility of a UE in a system without an HeNB GW. An RRC connection is established between the UE and an HeNB. An initial UE message is sent from the UE to an MME. The MME requests a service type of the UE from a Domain Name System (DNS). The service type of the UE is sent from the DNS to the MME. An establish bearer request message is sent from the MME to a corresponding SGW based on an IP address of an LGW. The IP address of the LGW is obtained by the MME through an S1 setup request message. The establish bearer request message is sent from the SGW to the LGW. An establish bearer response message is sent from the LGW to the SGW in response to the establish bearer request message. The establish bearer response message is sent from the SGW to the MME.

According to yet another aspect of the present invention, a method is provided for supporting mobility of a UE in a system without an HeNB GW. An RRC connection is established between the UE and an HeNB. An initial UE message is sent from the HeNB to an MME. An NAS message is sent from the UE to the MME. The NAS message includes a service type of the UE. An establish bearer request message is sent from the MME to a corresponding SGW based on an IP address of an LGW. The IP address of the LGW is obtained by the MME through an S1 setup request message. The establish bearer request message is sent from the SGW to the LGW. An establish bearer response message is sent from the LGW to the SGW in response to the establish bearer request message. The establish bearer response message is sent from the SGW to the MME.

According to another further aspect of the present invention, a method is provided for supporting mobility of a UE in a system without an HeNB GW. An RRC connection is established between the UE and an HeNB. An initial UE message is sent from the HeNB to an MME. An NAS message is sent from the UE to the MME. The MME downloads subscription information of the UE through an HSS. The subscription information includes a service type of the UE. An establish bearer request message is sent from the MME to a corresponding SGW based on an IP address of an LGW. The IP address of the LGW is obtained by the MME through an S1 setup request message. The establish bearer request message is sent from the SGW to the LGW. An establish bearer response message is sent from the LGW to the SGW in response to the establish bearer request message. The establish bearer response message is sent from the SGW to the MME.

Figure 4:
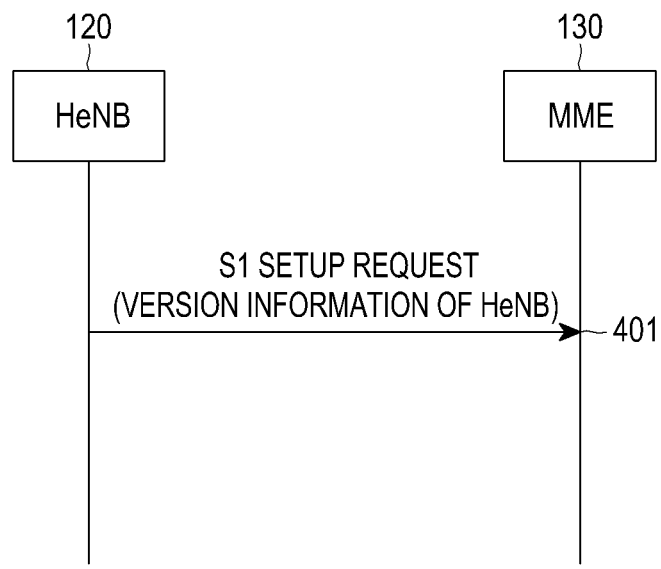
FIG. 4 is a flow chart illustrating an S1 establishment procedure, according to an embodiment of the present invention.

FIG. 4 is a flow chart of an S1 establishment procedure, according to an embodiment of the present invention. In step 401, an HeNB 120 sends an S1 setup request message to an MME 130. The S1 setup request message contains version information of the HeNB 120.

The version information of the HeNB can indicate the capability of the HeNB, such as, for example, whether it supports R-10 LIPA, R-11 LIPA or SIPTO femto. The MME can determine that the HeNB to which the UE is to be connected is an R-10 HeNB supporting LIPA, an R-11 HeNB supporting LIPA or an R-11 HeNB supporting SIPTO, through the version information of the HeNB. Three equipment capabilities of the HeNB are listed, but there are at least one or two kinds of equipment capabilities for actual applications, such as, for example, combinations of any two of R-10 LIPA, R-11 LIPA and SIPTO femto, or other combinations, as long as the realization of an embodiment of the present invention is not affected.

Figure 5:
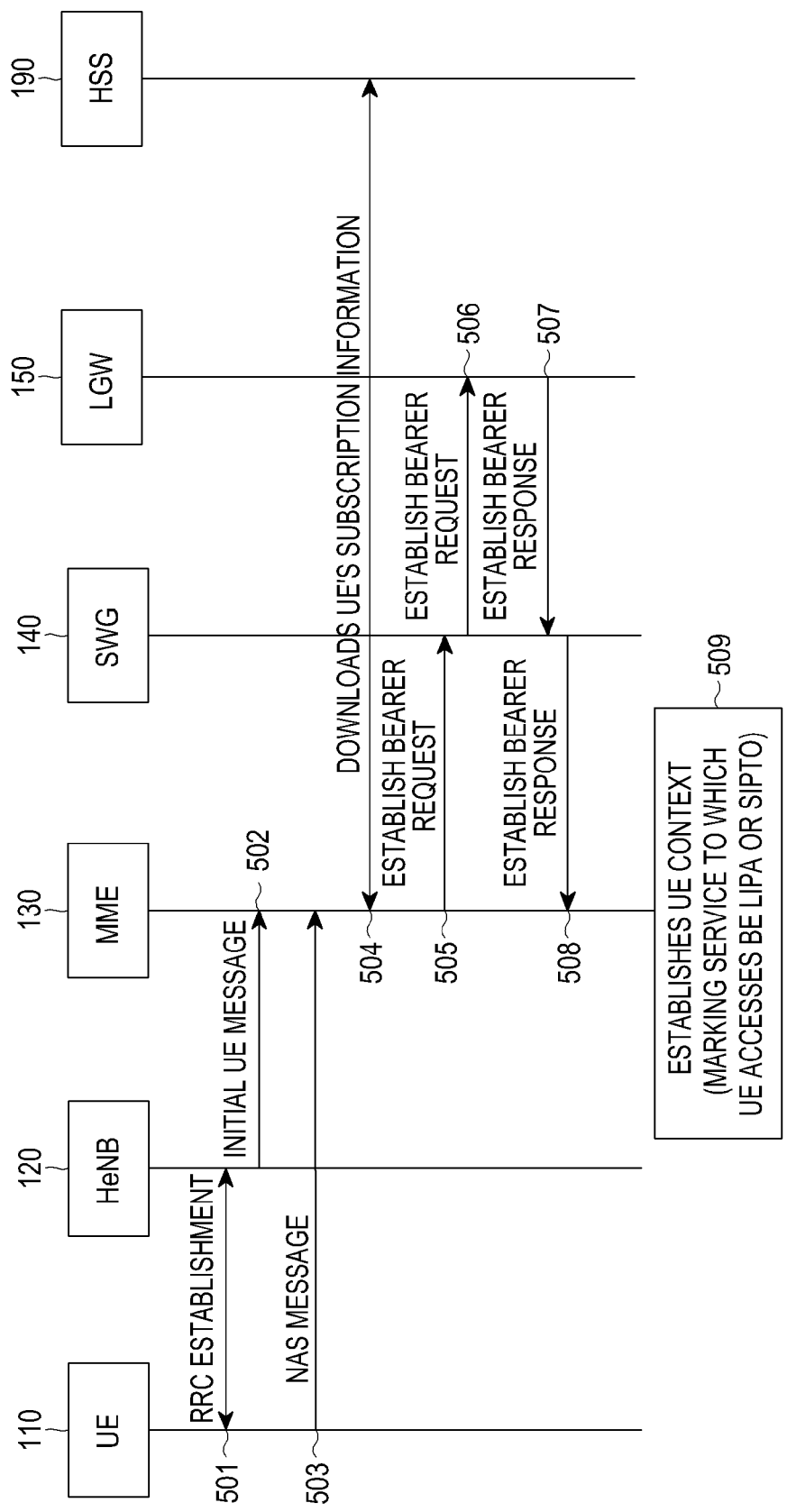
FIG. 5 is a flow chart illustrating a procedure of activating LIPA/SIPTO service of a method for supporting UE mobility, according to an embodiment of the present invention.

After the S1 establishment procedure, when a UE requests access to LIPA or SIPTO services, a procedure is performed in accordance with FIG. 5. Specifically, FIG. 5 is a flow chart illustrating a procedure of activating LIPA/SIPTO service of a method for supporting UE mobility, according to an embodiment of the present invention.

In step 501, an RRC connection is established between the UE 110 and the HeNB 120. In step 502, HeNB 120 sends an initial UE message to MME 130. In step 503, the UE 110 sends an NAS message to the MME 130. The NAS message can be an attach request message or Public Data Network (PDN) connectivity message. In step 504, the MME 130 downloads subscription information of the UE 110 from HSS 190. The subscription information includes an identification of whether the UE 110 allows the LIPA and an accessible Closed Subscriber Group (CSG) list, such as, for example, LIPA-allowed, LIPA-prohibited and LIPA-conditional. The corresponding CSG also includes accessible Access Point Name (APN) information. It should be noted that step 504 is required only when the UE executes the attach procedure. In other procedures, the MME 130 has saved the subscription information and step 504 is not required.

In step 505, the MME 130 sends an establish bearer request message to the corresponding SGW 140, based on the IP address of the LGW 150. The SGW 140 sends the establish bearer request message to the LGW 150. The MME 130 can obtain the IP address information of the LGW 150 corresponding to the HeNB 120 and CSG ID corresponding to the HeNB 120 through the S1 setup request message of FIG. 4. The MME 130 determines whether the LIPA can be activated based the above information and the UE's subscription information. If the HeNB 120 provides the IP address, which shows the ability of the HeNB 120 in supporting the LIPA, and the CSG ID corresponding to the HeNB 120 is in the current UE accessible CSG list, then the MME 130 activates the LIPA.

The MME 130 searches the LGW 150 according to the LGW IP address carried in the S1 setup request message. The corresponding LGW IP address can be searched in the DNS service through the MME 130 as well, as long as the realization of embodiments of the present invention is not affected.

In step 507, after the network side bearer establishment is completed, the LGW 150 sends an establish bearer response message to the SGW 140, and in step 508, the establish bearer response message is sent from the SGW 140 to the MME 130.

In step 509, the MME 130 establishes UE context, according to the obtained version information of the HeNB 120 and the downloaded subscription information. The UE context indicates that the service to which the UE accesses is R-10 LIPA, R11 LIPA or SIPTO femto. Therefore, The MME 130 knows the current accessed device is R-10 HeNB supporting LIPA, R-11 HeNB supporting LIPA or HeNB supporting SIPTO.

If it can be determined whether R-10 LIPA or the R11 LIPA is activated when the MME determines to activate the LIPA, a current service type can be identified in the corresponding service type. The MME updates the current service type in the UE context to be R-10 LIPA (not supporting mobility), R-11 LIPA (supporting mobility), or SIPTO femto. According to requirements, the service types can also be divided into two types, such as, for example, R-10 LIPA and R-11 LIPA, or another combination. The updated current service type can be indicated by adding an identifying field, such as service active flag, in the UE context, which is described in detail below with reference to Table 1.

TABLE 1

| Content | Description |
|---|---|
| CSG subscriber data | CSG subscriber information is a list of CSG IDs per PLMN. Each CSG ID has an associated effective time, the effective time means that the CSG ID is valid in the limited time. If there is no associated effective time, it means non-limited subscriber information. Each CSG ID can be used to access specific PDNs via LIPA. Each CSG ID includes the corresponding APN(s) information. |
| Allowance of the use of LIPA when visiting PLMN | It is specified whether UE is allowed to use LIPA service in this PLMN. |
| Service active flag | It is specified that the current APN is used for R-10 LIPA, R-11 LIPA, or SIPTO femto. |
| Allowance of access to SIPTO | It is specified that the service corresponding to the current APN is allowed to do SIPTO or not allowed to do SIPTO. |
| Allowance of access to LIPA | It is specified that the current APN can do LIPA. There are three corresponding parameters: LIPA-prohibited, LIPA-only and LIPA-conditional. |

Because the updated current service type of the UE is indicated in the UE context established by the MME, when the UE moves, the MME can determines whether to support the UE mobility according to the indicated current service type of the UE.

The form of the subscriber information of the UE is shown with respect to Table 2 below.

TABLE 2

| Content | Description |
|---|---|
| Access Point Name (APN) | The defined identifier is stipulated according to names of DNS, and the access point name accessible to packet data network is described. |
| CSG subscriber data | CSG subscriber information is a list of CSG IDs per VPLMN. Each CSG ID has an associated effective time, the effective time means that the CSG ID is valid in limited time. If there is no associated effective time, it means non-limited subscriber information. Each CSG ID can be used to access specific PDNs via LIPA. Each CSG ID includes the corresponding APN(s) information. |
| Allowance of the use of LIPA when visiting PLMN | It is specified whether UE is allowed to use LIPA service in this PLMN. |
| Allowance of access to SIPTO | It is specified that the service corresponding to the current APN is allowed to do SIPTO or not allowed to do SIPTO. |
| Allowance of access to LIPA | It is specified that the current APN can do LIPA. There are three corresponding parameters: LIPA-prohibited, LIPA-only and LIPA-conditional. |

In the following, an HeNB having two equipment capabilities, such as R-10 HeNB and R11 HeNB, is provided as an example for illustration. The details refer to the following five situations.

1. If the equipment capability obtained by the MME is an R-10 LIPA HeNB, the UE supports LIPA only in the subscriber information, and the APN information requested by the UE coincides with APN information corresponding to CSG, then the MME determines the service type activated by the UE as R-10 LIPA.

2. If the equipment capability obtained by the MME is an R-10 LIPA HeNB, the parameter allowing LIPA for the UE in the subscriber information is LIPA only, and the parameter allowing SIPTO allows access to SIPTO, but the APN information carried by the UE in the NAS message coincides with APN information contained in the CSG list, then the MME determines the service type activated by the UE as R-10 LIPA.

3. If the UE does not carry an APN message in the NAS information, or APN information carried in the NAS message is not in the corresponding APN in CSG list but in the subscriber information, then the MME determines the service type activated by the UE as SIPTO femto.

4. If the equipment capability obtained by the MME is R-11 LIPA HeNB, and the parameter allowing LIPA for the UE in the subscriber information is LIPA only, and the APN information requested by the UE coincides with APN information corresponding to CSG, then the MME determines the service type activated by the UE as R-11 LIPA.

5. If the equipment capability obtained by the MME is R-11 LIPA HeNB, the parameter allowing LIPA for the UE in the subscriber information is LIPA only, and the parameter allowing SIPTO allows access to SIPTO, but the APN information carried by the UE in the NAS message coincides with APN information contained in the CSG list, then the MME determines the service type activated by the UE as R-11 LIPA. If the UE does not carry APN message in the NAS information, or APN information carried in the NAS message is not in the corresponding APN in CSG list but in the subscriber information, then the MME determines the service type activated by the UE as SIPTO femto.

The above embodiment of the present invention applies only in situations in which no HeNB GW is deployed in the network. When an HeNB GW is deployed in the network, HeNB cannot directly send the S1 setup request message that contains the version information of the HeNB to the MME in the S1 establishment procedure. Specifically, the MME cannot directly obtain the version information of the HeNB through the S1 setup request message.

Figure 6:
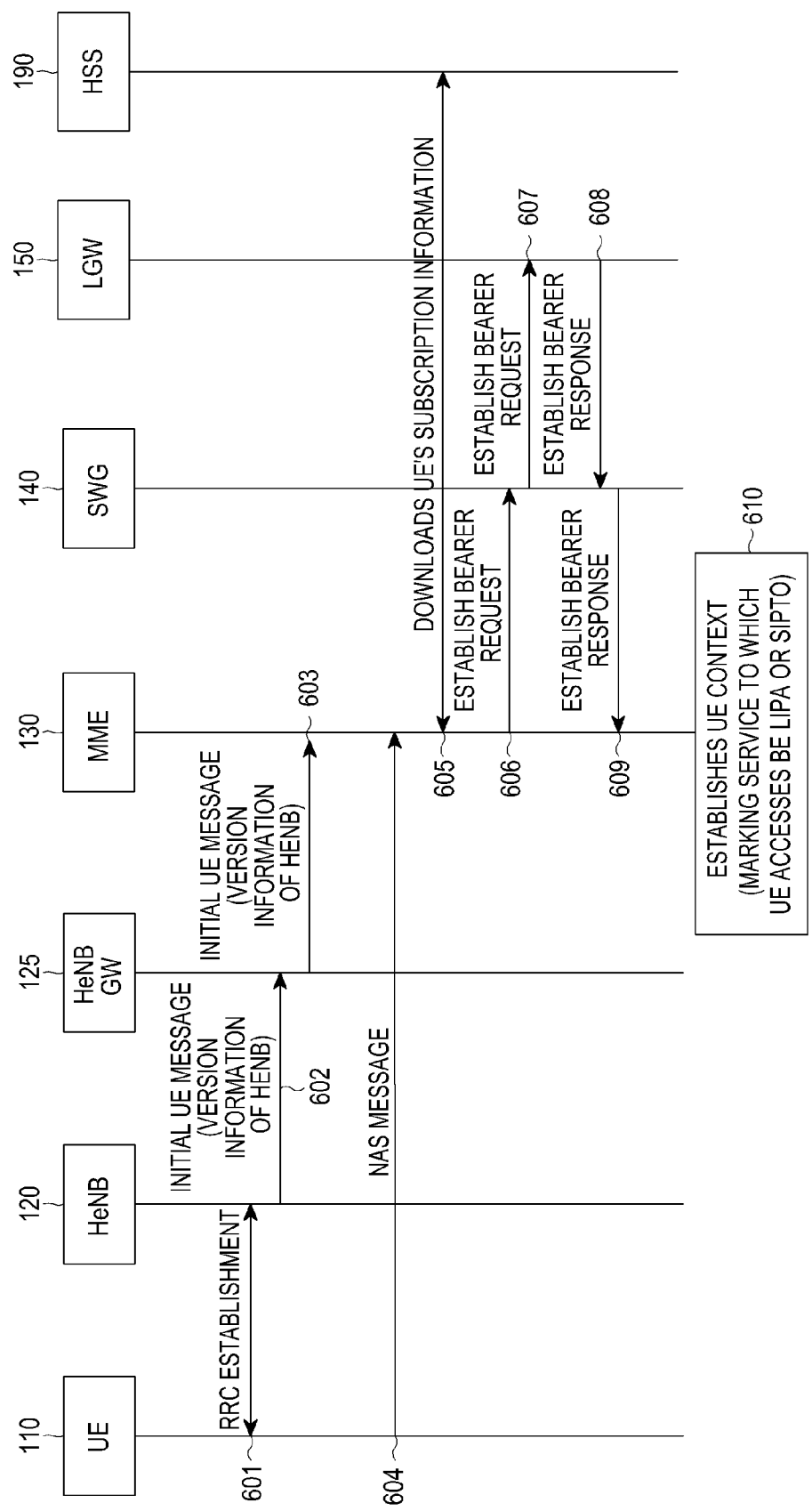
FIG. 6 is a flow chart illustrating the procedure of activating LIPA/SIPTO service of the method for supporting UE mobility, according to an embodiment of the present invention.

FIG. 6 is a flow chart illustrating the procedure of activating LIPA/SIPTO service of the method for supporting UE mobility, according to an embodiment of the present invention.

In step 601, an RRC connection is established between a UE 110 and an HeNB 120. In step 602, the HeNB 120 sends an initial UE message to an HeNB GW 125. The initial UE message is sent to an MME 130 by the HeNB GW 125. The initial UE message contains version information of the HeNB 120.

Similarly, the version information of the HeNB 120 can indicate the capability of the HeNB 120, such as whether it supports an R-10 LIPA, an R-11 LIPA or an SIPTO femto. The MME 130 can determine the HeNB 120 to which the UE 110 is to be connected as an R-10 HeNB supporting LIPA, an R-11 HeNB supporting LIPA or an R-11 HeNB supporting SIPTO.

Steps 604-610 are substantially identical to steps 503-509 of FIG. 5, and a detailed description is provided above.

Determining the service type at the MME is the same as step 507 of FIG. 5.

In the embodiment of the present invention illustrated in FIG. 6, the version information of the HeNB is sent to the MME by the HeNB GW through the initial UE message. The version information of the HeNB can be sent to the MME through other messages, such as, for example, a handover message, as long as the realization of this embodiment of the present invention is not affected.

Figure 7:
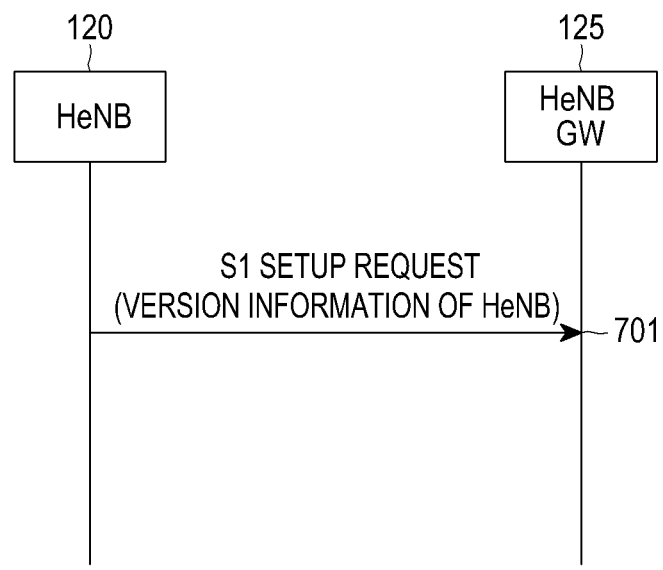
FIG. 7 is a flow chart illustrating the S1 establishment procedure, according to an embodiment of the present invention.

FIG. 7 is a workflow chart of an S1 establishment procedure, according to an embodiment of the present invention. In step 701, an HeNB sends an S1 setup request message to an HeNB GW. The S1 setup request message contains version information of the HeNB.

The version information of the HeNB can indicate the capability of the HeNB, such as, for example, whether it supports an R-10 LIPA, an R-11 LIPA or an SIPTO femto. The HeNB GW can determine the HeNB to which the UE is to be connected as an R-10 HeNB supporting LIPA, an R-11 HeNB supporting LIPA or an R-11 HeNB supporting SIPTO, through the version information of the HeNB.

Figure 8:
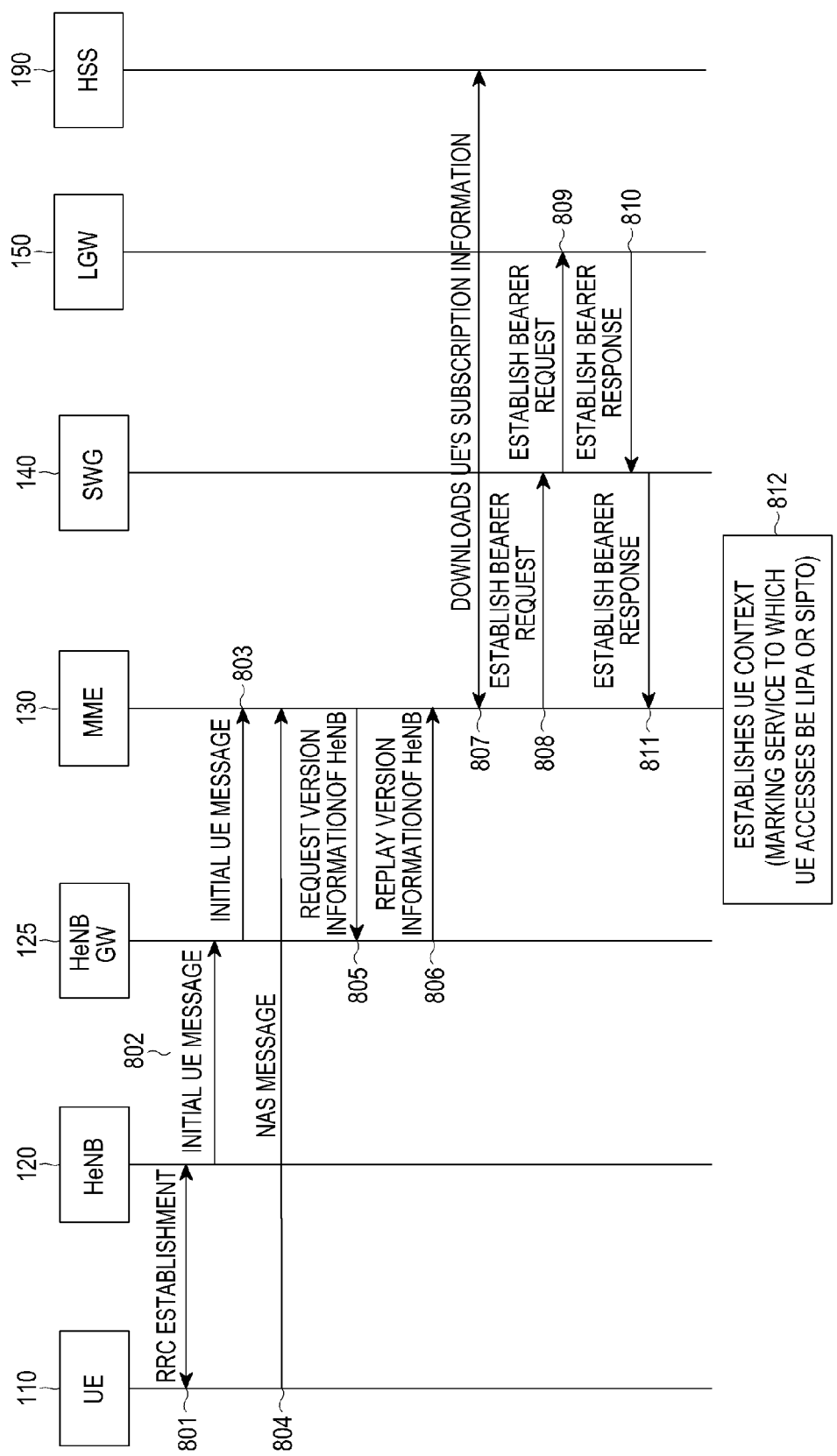
FIG. 8 is a flow chart illustrating the procedure of activating LIPA/SIPTO service of the method for supporting UE mobility, according to an embodiment of the present invention.

After the S1 establishment procedure, when there is a UE that requests access a LIPA or SIPTO service, a procedure is performed in accordance with FIG. 8. Specifically, FIG. 8 is a flow chart illustrating a procedure of activating LIPA/SIPTO service of a method for supporting UE mobility, according to an embodiment of the present invention.

In step 801, an RRC connection is established between a UE 110 and an HeNB 120. In step 802, the HeNB 120 sends an initial UE message to an HeNB GW 125, and in step 803, the initial UE message is sent from the HeNB GW 125 to an MME 130.

In step 804, the UE 110 sends a NAS message to the MME 130. The NAS message can be embodied as an attach request message or PDN connectivity message. In step 805, the MME 130 requests version information from the HeNB 120 from the HeNB GW 125. The MME 130 can request the version information of the HeNB 120 from the HeNB GW 125 through a new S1 setup request message or through other messages, as long as the realization of this embodiment of the present invention is not affected.

In step 806, the HeNB GW 125 transmits the version information of the HeNB 120 to the MME 130. Steps 807-812 are substantially identical to steps 504-509 of FIG. 5, and a detailed description is provided above.

The service type is determined by the MME 130 as in step 509 of FIG. 5.

In this embodiment of the present invention, the version information of the HeNB 120 is sent to the HeNB GW 125 by the HeNB 120 through the S1 setup request message, and the MME 130 actively requests for version information of the HeNB 120 from the HeNB GW 125.

Figure 9:
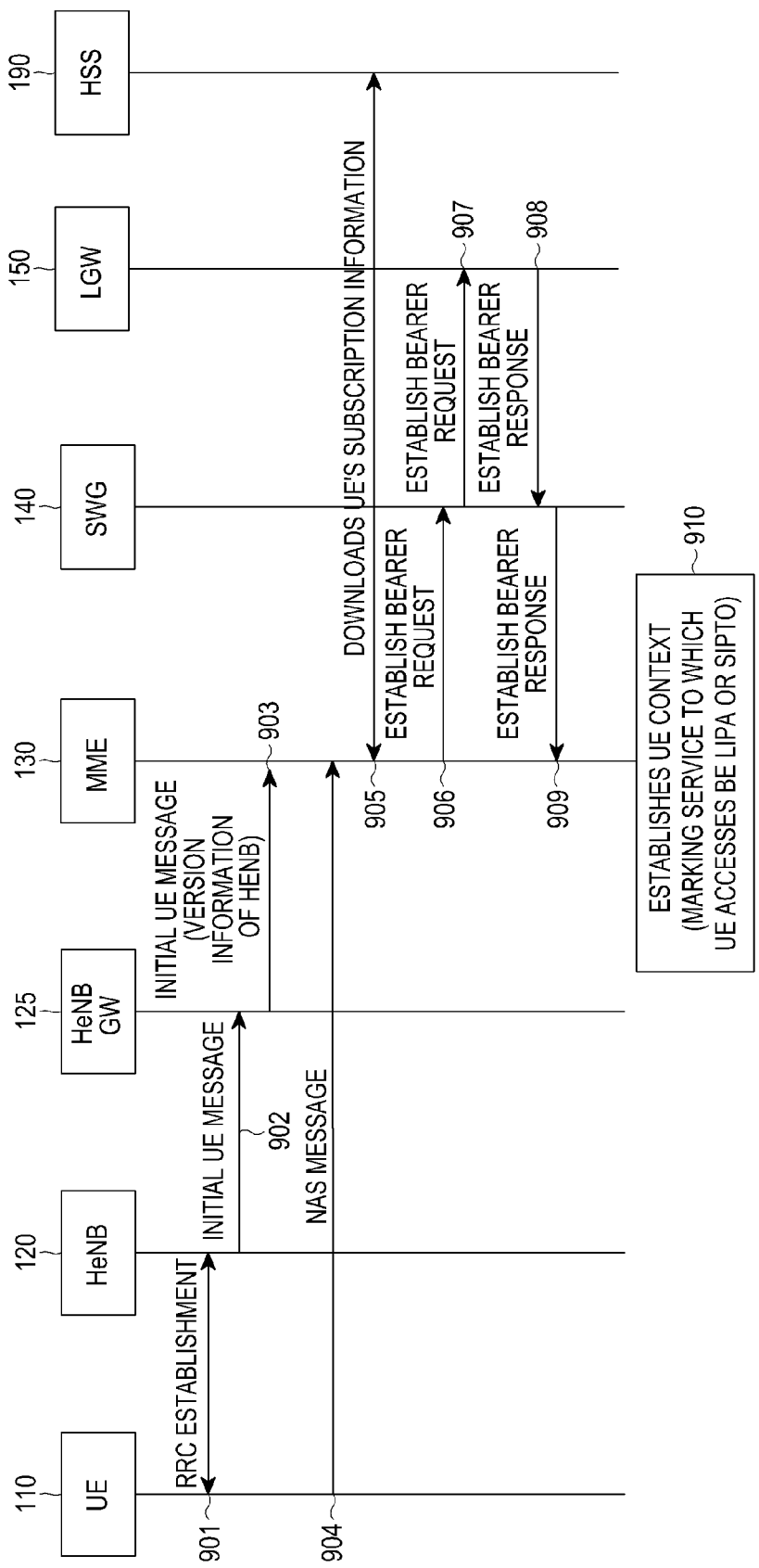
FIG. 9 is a flow chart illustrating the procedure of activating LIPA/SIPTO service of the method for supporting UE mobility, according to an embodiment of the present invention.

FIG. 9 is a flow chart illustrating the procedure of activating LIPA/SIPTO service of the method for supporting UE mobility, according to an embodiment of the present invention. Prior to implementation of this embodiment of the present invention, the S1 establishment procedure shown in FIG. 7 is required.

Steps 901-902 are substantially identical to steps 801-802 of FIG. 8, and detailed description is provided above.

In step 903, the HeNB GW 110 sends an initial UE message to the MME 130. This initial UE message includes version information of the HeNB 120.

When the HeNB 120 sends an S1 setup request message to the HeNB GW 125, the HeNB GW 125 can obtain the version information of the HeNB 120 corresponding to the connected HeNB. Thus, when the HeNB GW 125 sends the initial UE message to the MME 130, the version information of the HeNB 120 can be sent to the MME 130. The version information of the HeNB 120 can indicate the capability of the HeNB 120, such as, for example, whether it supports an R-10 LIPA, an R-11 LIPA or an SIPTO femto. The MME 130 can determine the HeNB 120 to which the UE 110 is to be connected as an R-10 HeNB supporting LIPA, an R-11 HeNB supporting LIPA or an R-11 HeNB supporting SIPTO, through the version information of the HeNB 120.

Steps 904-910 are substantially identical to steps 503-509 of FIG. 5, and a detailed description is provided above.

The service type is determined by the MME 130 in accordance with step 507, of FIG. 5.

In this embodiment of the present invention, the version information of the HeNB 120 is sent to the HeNB GW 125 by the HeNB 120 through the S1 setup request message, and the version information of the HeNB 120 can be sent to the MME 130 when the HeNB GW 125 sends the initial UE message to the MME 130. As detailed described in the above embodiments of FIGS. 4 to 9, the MME is able to determine the service type of the UE, based on the version information of the HeNB to support a UE mobility, and then sets the UE context information representing the service type using the version information of the HeNB and the subscriber information of the UE.

Figure 10:
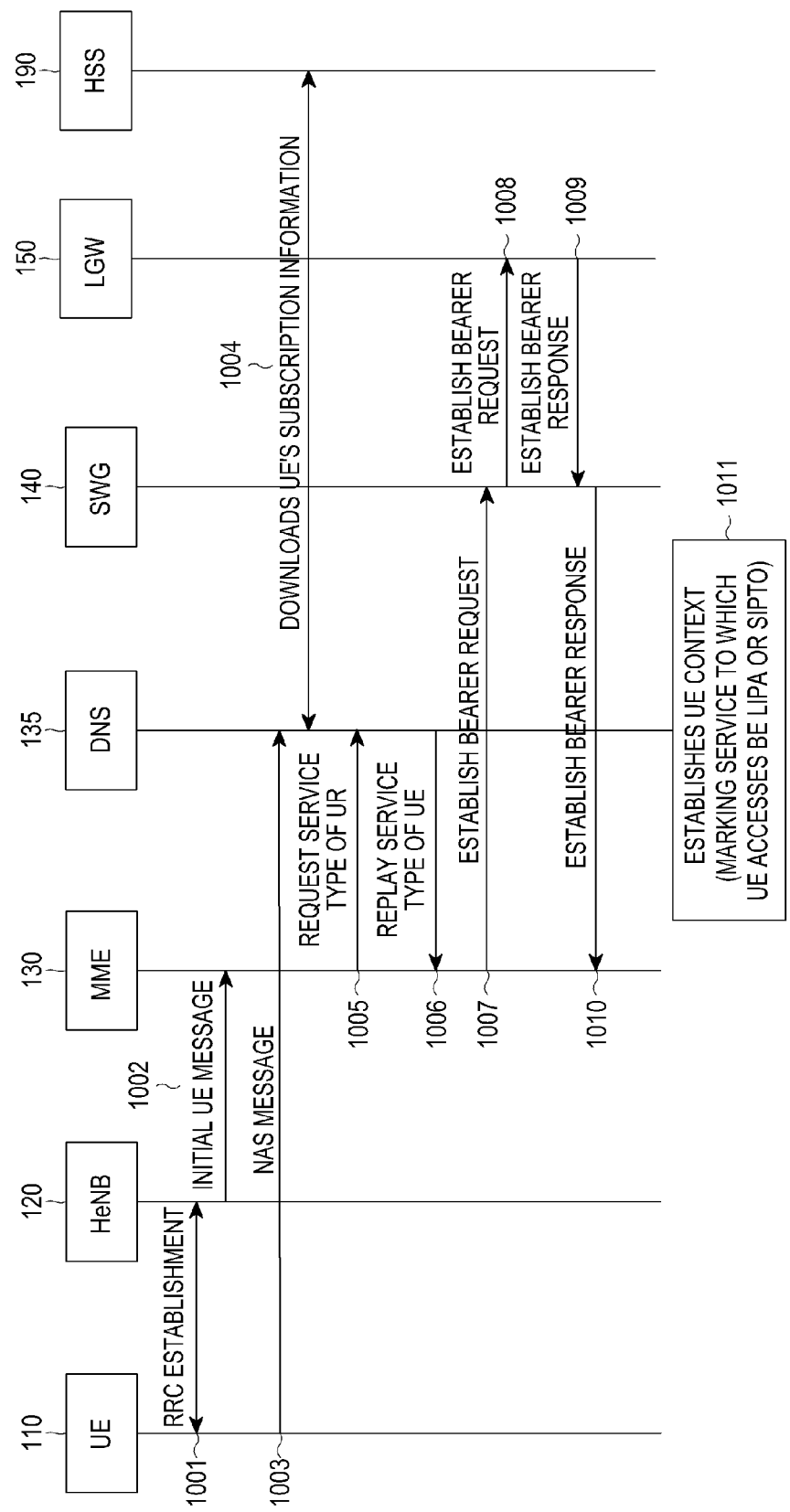
FIG. 10 is a flow chart illustrating the procedure of activating LIPA/SIPTO service of the method for supporting UE mobility, according to an embodiment of the present invention.

FIG. 10 is a flow chart illustrating the procedure of activating LIPA/SIPTO service of the method for supporting UE mobility, according to an embodiment of the present invention.

Steps 1001-1004 are substantially identical to steps 501-504 of FIG. 5, and a detailed description is provided above.

In step 1005, the MME 130 requests the service type of the UE 110 from the DNS 135.

The MME 130 needs to interact with the DNS server 135 in order to request the service type of the UE from DNS 135 prior to the selection of the LGW 150 and the SGW 140. The service type indicates the service is an R-10 LIPA service, an R-11 LIPA service or an SIPTO femto service.

The DNS server 135 saves the correspondence of the HeNB ID, APN and activatable service types. For example, Through an OAM server (not depicted), the DNS 135 can obtain the version information of the HeNB 120, such as, for example, an HeNB 120 that supports an R-10 LIPA, an R-11 LIPA or an SIPTO femto. The MME 130 that requests the service type of the UE 110 from the DNS 135 can be realized through the information interaction between existing information and the DNS 135, and can also be realized through a newly defined message, as long as the realization of this embodiment of the present invention is not affected.

In step 1006, the DNS 135 transmits the service type of the UE 110 to the MME 130. The service type of the UE 110, obtained by the DNS 135 according to the saved correspondence of HeNB 120, the APN and corresponding service types are provided to the MME 130.

Steps 1007-1009 are substantially identical to steps 505-509 of FIG. 5, and are described in detail above.

In this embodiment of the present invention, the MME sends a request message to the DNS to obtain the service type of the UE, and when the UE moves, the MME determines whether to support the UE mobility, according to the current service type of the UE.

Figure 11:
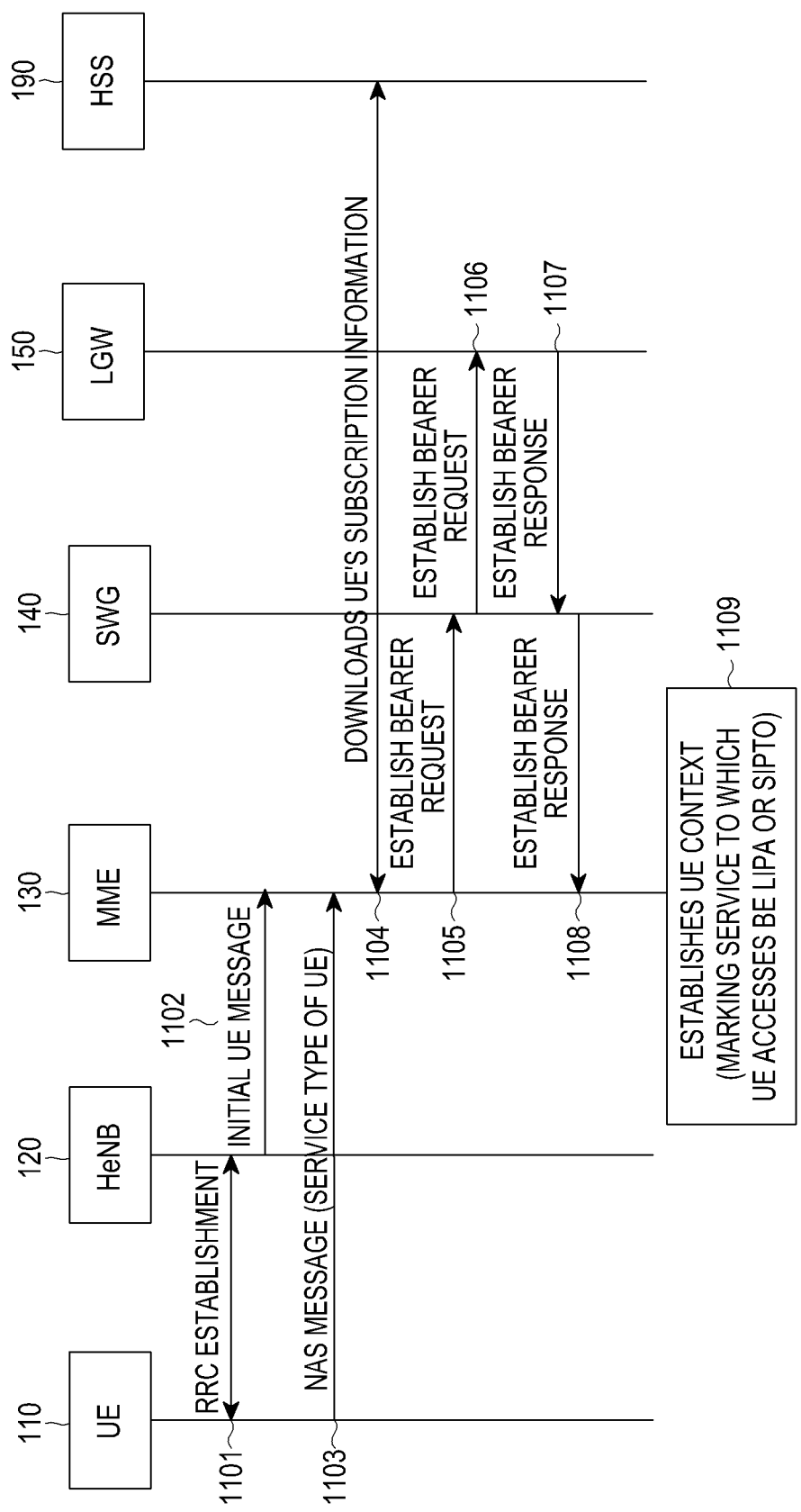
FIG. 11 is a flow chart illustrating the procedure of activating LIPA/SIPTO service of the method for supporting UE mobility, according to an embodiment of the present invention.

FIG. 11 is a flow chart illustrating the procedure of activating LIPA/SIPTO service of the method for supporting UE mobility, according to an embodiment of the present invention.

Steps 1101-1102 are substantially identical to steps 1001-1002 of FIG. 10, and are described in detail above.

In step 1103, the UE 110 sends an NAS message to the MME 130. The NAS message contains the service type of the UE 110.

Steps 1104-1107 are substantially identical to steps 504-509 of FIG. 5, and a detailed description is provided above.

In this embodiment of the present invention, the service type of the UE 110 is sent to the MME 130 when the UE 110 sends the NAS message to the MME 130, and when the UE 110 moves, the MME 130 determines whether to support the UE mobility according to the current service type of the UE 110.

Figure 12:
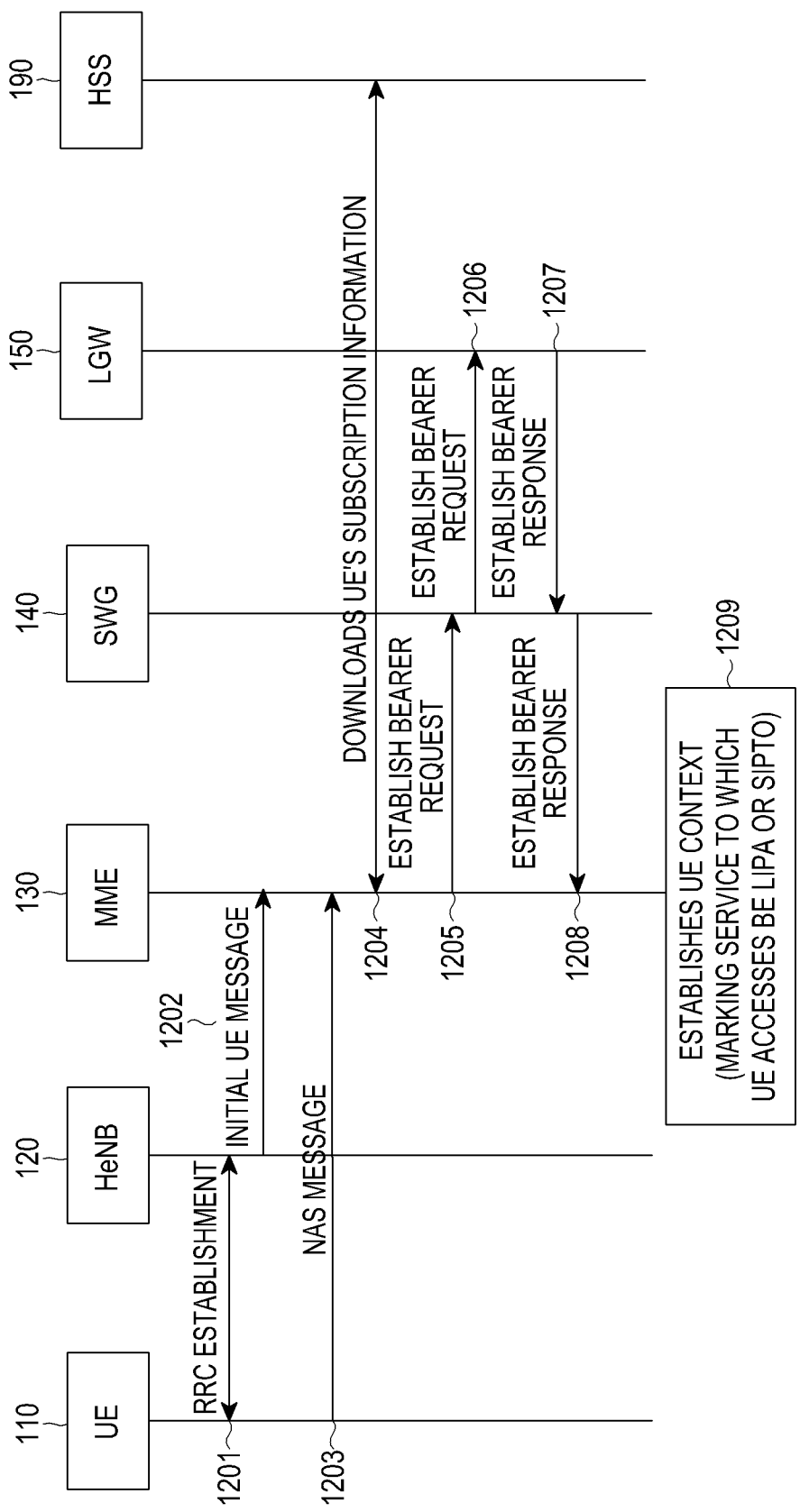
FIG. 12 is a flow chart illustrating the procedure of activating LIPA/SIPTO service of the method for supporting UE mobility, according to an embodiment of the present invention.

FIG. 12 is a flow chart illustrating the procedure of activating LIPA/SIPTO service of the method for supporting UE mobility, according to an embodiment of the present invention.

Steps 1201-1203 are substantially identical to steps 1001-1003 of FIG. 10, and a detailed description is provided above.

In step 1204, the MME 130 downloads the subscription information of the UE 110 through the HSS 190. The subscription information of the UE 110 contains the service type of the UE 110.

The adopted form of the subscription information is different from that of Table 2, and Table 3 is adopted. Specifically, a service type identifier of the UE 110 is added to Table 2. The identifier contains the following parameters: UE supporting R-10 LIPA, supporting R-11 LIPA, supporting SIPTO femto service; or contains two kinds of parameters: supporting R-10 LIPA and supporting R-11 LIPA, or another combination, as long as the realization of this embodiment of the present invention is not affected.

TABLE 3

| Content | Description |
|---|---|
| Access Point Name (APN) | The defined identifier is stipulated according to names of DNS, and the access point name accessible to packet data network is described. |
| CSG subscriber data | CSG subscriber information is a list of CSG IDs per PLMN. Each CSG ID has an associated effective time, the effective time means that the CSG ID is valid in limited time. If there is no associated effective time, it means non-limited subscriber information. Each CSG ID can be used to access specific PDNs via LIPA. Each CSG ID includes the corresponding APN(s) information. |
| Allowance of the use of LIPA when visiting PLMN | It is specified whether UE is allowed to use LIPA service in this PLMN. |
| Service type identifier | It indicates the current service type supported by the UE: supporting R-10 LIPA, supporting R-11 LIPA, supporting SIPTO femto. |
| Allowance of access to SIPTO | It is specified that the service corresponding to the current APN is allowed to do SIPTO or not allowed to do SIPTO. |
| Allowance of access to LIPA | It is specified that the current APN can do LIPA. There are three corresponding parameters: LIPA-prohibited, LIPA-only and LIPA-conditional. |

Because the subscriber information of the UE 110 contains the service type of the UE 110, when the MME 130 downloads the subscriber information, the MME 130 can directly determine the current service type of the UE 110 according to the service type of the UE 110 in the subscriber information.

Steps 1205-1207 are substantially identical to steps 505-507 of FIG. 5, and a detailed description is provided above.

In this embodiment of the present invention, the UE's service type identifier is added to the UE's subscriber information. The MME 130 can obtain the service type of the UE 110 when the MME 130 downloads the UE's subscriber information. When the UE 110 moves, the MME 130 determines whether to support the UE's mobility according to the current service type of the UE 110.

All of the above embodiments of the present invention utilize the LTE system, however, the present invention is not limited thereto. For a UMTS system, since the HNB GW is a required node, the UMTS system can adopt embodiments of the present invention in which the HeNB GW is deployed. The HNB corresponds to the HeNB, the HNB GW corresponds to the HeNB GW, the SGSN corresponds to the MME, and the GGSN corresponds to the SGW and the LGW.

Figure 13:
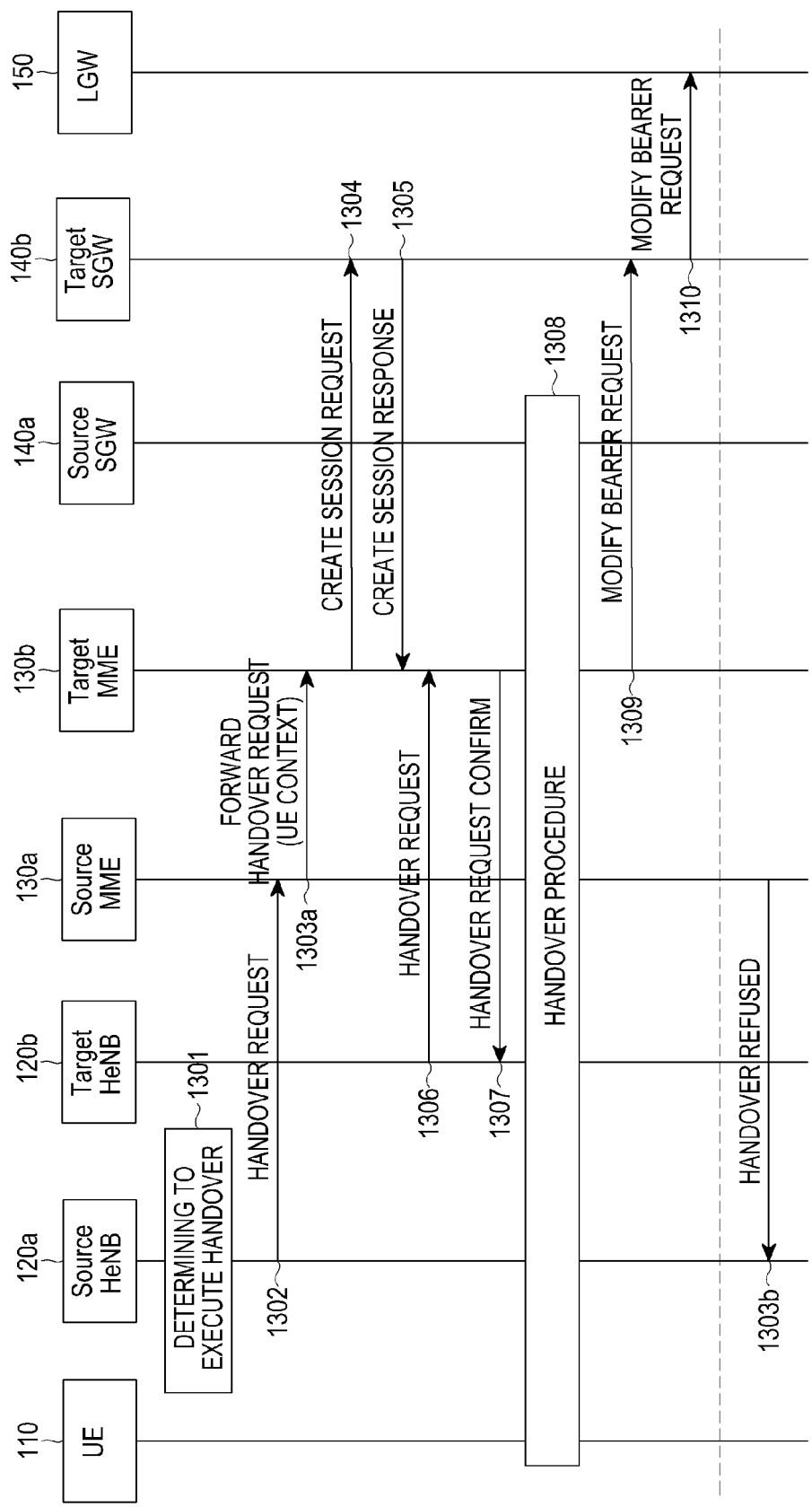
FIG. 13 is a flow chart illustrating a method of determining UE mobility by an MME, according to an embodiment of the present invention.

After the procedure of activating LIPA/SIPTO service of the above embodiments of the present invention is completed, the MME can determine the UE mobility. FIG. 13 is a flow chart illustrating a method of determining UE mobility by an MME, according to an embodiment of the present invention. The flow chart illustrates a process in which the MME correctly determines UE mobility when the UE in an activated state and moves.

In step 1301, a source HeNB 120a determines to execute a handover. In step 1302, the source HeNB 120a sends a handover request message to a source MME 130a.

The source MME 130a can determine the current service type of the UE 110 according to the current UE context information. If the service type of the UE 110 is an R-11 LIPA or an SIPTO femto, and it is known that the current UE 110 is still in an LIPA network or an SIPTO network through the currently obtained target CSG ID information or network identifier information, then the source MME 130a continues the handover process and step 1303a is performed.

The source MME 130a can determine the current service type of the UE 110 according to current UE context information. If the service type of the UE 110 is an R-10 LIPA, then the source MME 130a needs to verify whether the current UE bearer information still includes a LIPA bearer. If the LIPA bearer is included, after the source MME 130a refuses handover, step 1303b is performed.

In step 1303, the source MME 130a sends a forward handover request message to a target MME 130b. The forward handover request message contains the UE context information, and also contains a newly defined UE service type parameter.

In step 1304, the target MME 130b sends a create session request to a target SGW 140b. in step 1305, The target SGW 140b transmits a create session response message to the target MME 130b. The subsequent steps 1306-1308 are substantially identical to an existing handover procedure.

In step 1309, the target MME 130b continues establishing a direct tunnel between the HeNB and the PGW for the target network, according to the service type of the UE. For example, the service type of the UE 110 can be R-11 LIPA, and the UE context information. The target MME 130b sends a modify bearer request message to the target SGW 140b.

In step 1310, the target SGW 140b sends the modify bearer request message to the LGW 150. Furthermore, in step 1303b, the source MME 130a refuses a handover. In this case, the source MME 130a sends a handover refuse message to the source HeNB 1303b.

Figure 14:
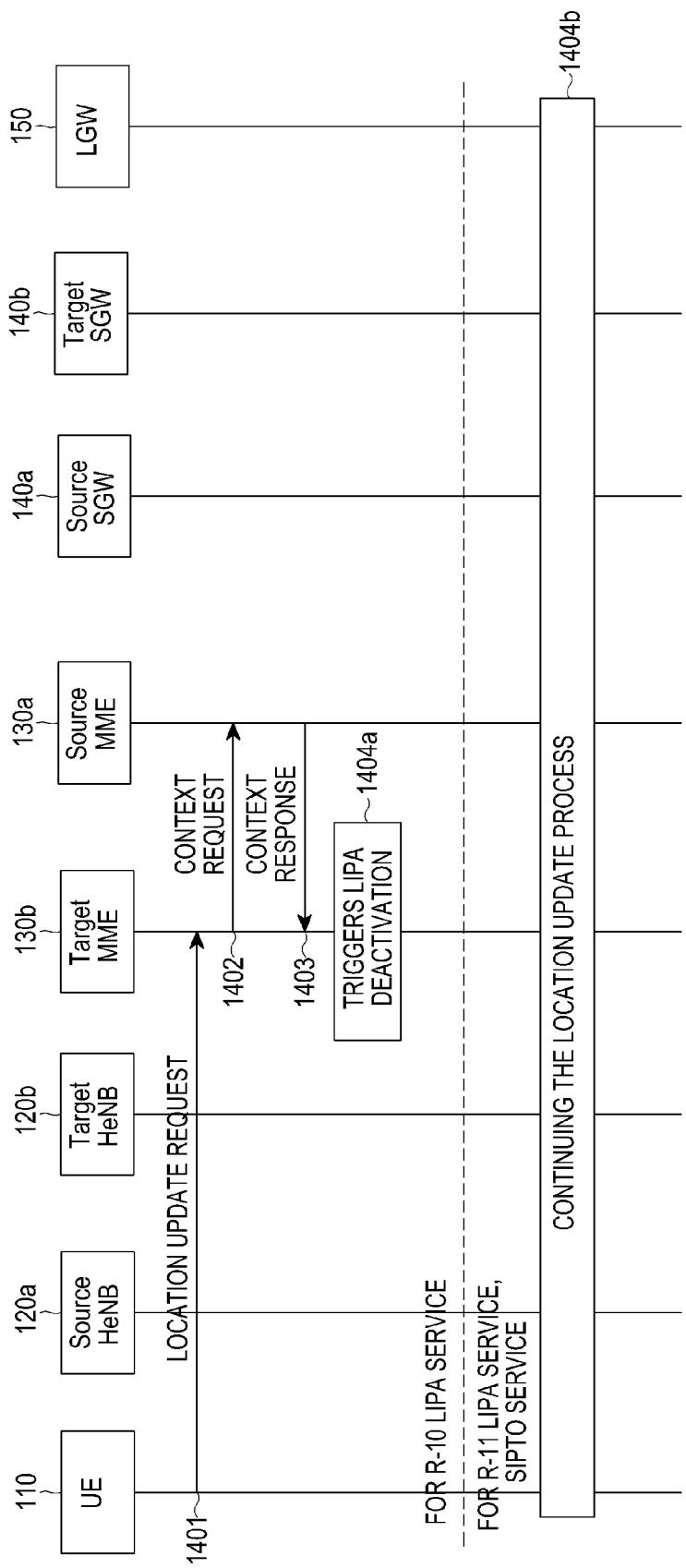
FIG. 14 is a flow chart illustrating the method of determining mobility of the UE by the MME, according to an embodiment of the present invention.

FIG. 14 is a flow chart illustrating a method of determining mobility of the UE by the MME, according to an embodiment of the present invention. Specifically, FIG. 14 illustrates a process of the MME correctly determining UE mobility when the UE is in an idle state and moves.

In step 1401, the UE 110 sends a location update request message to a target MME 130b. In step 1402, the target MME 130b sends a context request message to the source MME 130a. In step 1403, the source MME 130a sends a context response message to the target MME 130b. The context response message contains UE context information, and also contains a newly defined UE service type parameter in the present invention.

If the service type of the UE 110 is an R-10 LIPA, in step 1404a, the target MME 130b triggers the LIPA deactivation process, after the target MME 130b activates the bearer information related to the LIPA.

If the service type of the UE 110 is an R-11 LIPA or an SIPTO femto, and the target MME 130b determines that the UE is still in the LIPA network or SIPTO network, and in step 1404b, the target MME 130b continues the location update process.

In another embodiment, the above procedures associated with the LIPA deactivation process in the step 1404a and the location update process in step 1404b are able to be performed by the source MME 130a.

In the above embodiments, the MME can be configured to comprise a communication interface for communicating with a network entity, and a controller for performing mobility control of the UE according to embodiments of FIGS. 4 to 14.

In supporting UE mobility adopted in the embodiments of the present invention, the service type of the UE is obtained by the MME. When the UE initiates handover, the MME can determine whether the service continuity can be ensured after the UE handover to a target base station according to the obtained service type. If the service continuity can be ensured, the handover is successful, otherwise, the handover is failed, thereby reducing the waste of signaling resources and radio resources.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for supporting mobility of a user equipment (UE) by a mobile management entity in a wireless communication system, the method comprising the steps of:
    obtaining, at the mobile management entity, version information of a base station;
    obtaining, at the mobile management entity, subscription information of the UE;
    estimating, at the mobile management entity, a service type invoked for connection between the UE and the base station based on the obtained version information and the obtained subscription information;
    establishing, at the mobile management entity, UE context information indicating the estimated service type;
    receiving, at the mobile management entity, a handover request of the UE from the base station; and
    determining, at the mobile management entity, whether to allow the received handover request based on the service type indicated by the UE context information,
    wherein the service type is one of a local internet protocol access (LIPA) and a selected internet protocol traffic offload (SIPTO).

2. The method of claim 1, wherein the version information comprises information indicating a capability of the base station which represents whether the mobility is supported or not.

3. The method of claim 1, wherein the version information is provided by using an S1 setup request message transmitted from the base station.

4. The method of claim 1, wherein the version information is obtained via an HeNB gateway (HeNB GW) from the base station.

5. An apparatus for supporting mobility of a user equipment (UE) in wireless communication, the apparatus comprising:
    a communication interface configured to communicate with a network entity; and
    a controller configured to obtain version information of a base station and subscription information of the UE through the communication interface, to estimate a service type invoked for connection between the UE and the base station based on the obtained version information and the obtained subscription information, to establish UE context information indicating the estimated service type, and to determine whether to allow a handover request based on the service type indicated by the UE context information, when the handover request of the UE is received from the base station,
    wherein the service type is one of a local internet protocol access (LIPA) and a selected internet protocol traffic offload (SIPTO).

6. The apparatus of claim 5, wherein the version information comprises information indicating a capability of the base station, which represents whether or not the mobility of the UE is supported.

7. The apparatus of claim 5, wherein the version information is provided by using an S1 setup request message transmitted from the base station.

8. The apparatus of claim 5, wherein the version information is obtained via a HeNB gateway (HeNB GW) from the base station.

\* \* \* \* \*